INVENTOR
CECIL B. ELLIS
ATTORNEY

July 31, 1962 C. B. ELLIS 3,047,485
SAFETY ARRANGEMENT FOR NEUTRONIC REACTORS
ABOARD WATER-SUSTAINED CRAFT
Filed Nov. 15, 1957 2 Sheets-Sheet 2

INVENTOR
CECIL B. ELLIS
BY C. N. Miranda
ATTORNEY

United States Patent Office 3,047,485
Patented July 31, 1962

3,047,485
SAFETY ARRANGEMENT FOR NEUTRONIC REACTORS ABOARD WATER-SUSTAINED CRAFT
Cecil B. Ellis, White Plains, N.Y., assignor to Foster Wheeler Corporation, New York, N.Y., a corporation of New York
Filed Nov. 15, 1957, Ser. No. 696,856
10 Claims. (Cl. 204—193.2)

This invention relates to neutronic reactors for use aboard water-sustained craft and more particularly to safety arrangements for such reactors.

In the event of ship collision, grounding, explosion, fire or other disaster at sea which would cause either sinking of a water-sustained vessel utilizing a neutronic reactor, or stoppage of the greater part of the power plant equipment, a dangerous condition arises due to the generation of radioactive decay heat which is generated for many hours by the reactor after stoppage.

Present proposals for nuclear powered ships contemplate an arrangement wherein a reactor which employs its fuel in a fluid or fluidized state, and all of the piping and equipment of the primary loop containing the fluid are enclosed in a heavy-walled tightly-sealed metal compartment, in turn surrounded by a thick primary reactor shield. Upon the occurrence of a disaster which inactivates all of the circulating pumps, the reactor fuel temperature will rise as a result of radioactive decay heat until a relief valve, rupture disc or other similar device exhausts the fuel from the reactor core and piping onto the floor of the metal compartment. Thereafter, the fuel will continue to heat up. In a compartment of a size practical for shipboard use, the vapor pressure of the fuel rises to values which may eventually cause rupturing of the compartment wall and so permit escape of dangerously radioactive fuel vapor to the outside atmosphere. If the fuel is contained in a water solution or slurry, the vapor pressure of water rises rapidly at moderate temperatures.

The present invention contemplates a novel safety arrangement for neutronic reactors aboard water-sustained craft or vessels wherein radioactive decay heat which occurs in the event of a disaster aboard said craft is safely removed.

In accordance with the present invention, the metal compartment which encloses the reactor and all piping and equipment of the primary loop is disposed within the interior of a primary reactor shield and spaced from the latter to define a water channel completely surrounding the metal compartment. The water channel is adapted for communication with the exterior of the ship by a plurality of large diameter conduits which connect different points in the water channel with various points on the sides and the bottom of the ship's hull. Valve means are provided in each of the conduits and are normally closed to cut off communication of the water channel with the sea water, exterior of the ship. Upon the occurrence of a disaster to the ship, however, the valve means are actuated to open positions to permit communication of the water channel with the ship's exterior. The conduits are so disposed that regardless of the position of the ship, as in sinking thereof, several of the conduits have their openings free of obstruction and at least two of these unobstructed conduits will be at different elevations above the bottom of the sea. Consequently, the generation of radioactive decay heat in the metal compartment causes a natural circulation of sea water through the conduits and water channel by reducing the density of the sea water in the water channel which is intermediate communicating conduits.

The above and other objects and advantages of the present invention will appear more fully hereinafter from a consideration of the detailed description which follows taken together with the accompanying drawings wherein the invention is illustrated.

Figure 1:
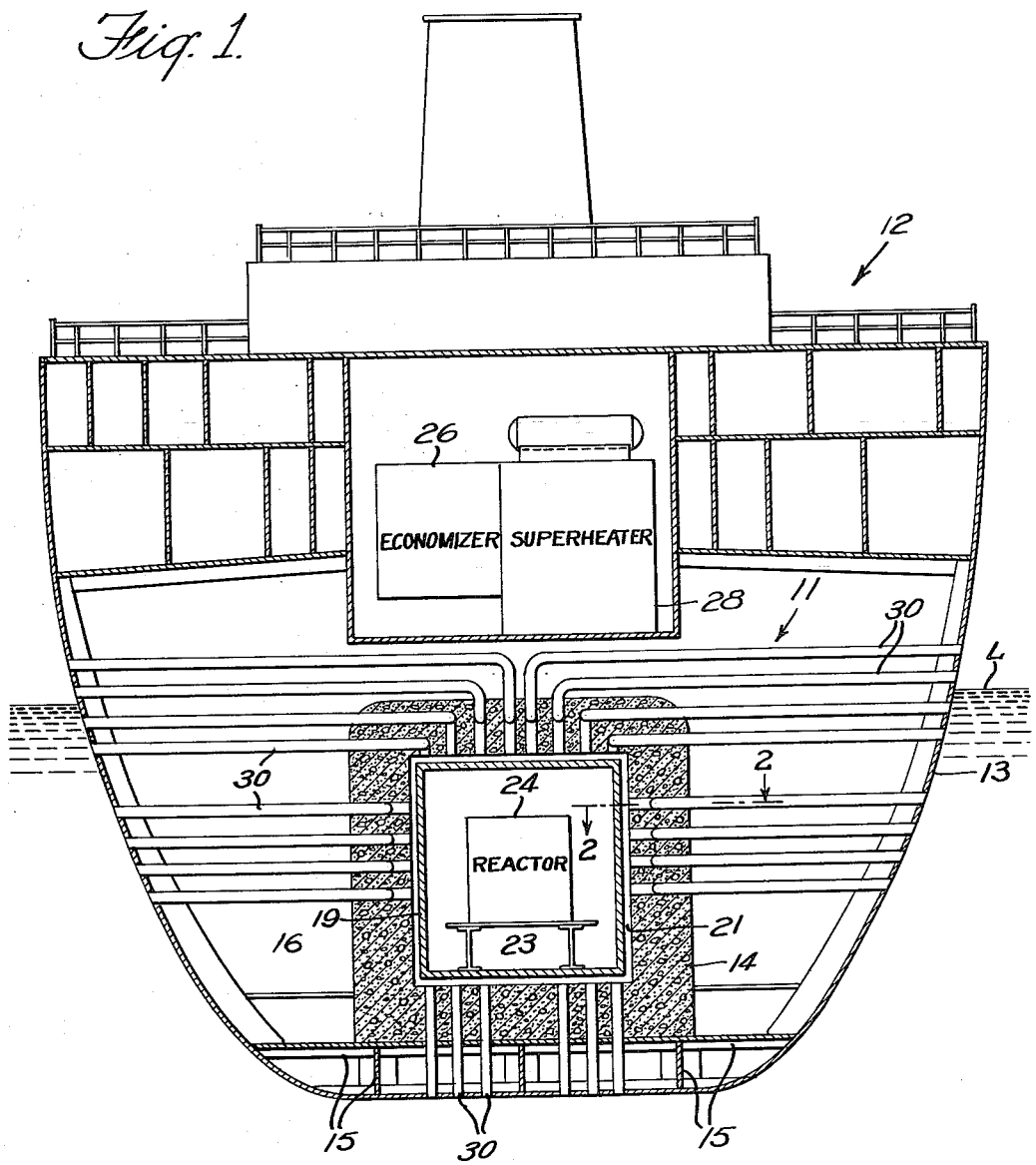
FIG. 1 is a schematic illustration, in elevation, of the cross section of a ship embodying the novel safety arrangement of the present invention.

Referring now to the drawings for a more detailed description of the present invention and more particularly to FIG. 1 thereof, the safety arrangement of the present invention is generally designated by the numeral 11 and is shown aboard a water sustained vessel or craft 12 having a hull 13. A thick-wall reactor shield 14 of suitable material, as for example concrete, or steel, water and lead, supported by structural members 15, is disposed in a hold 16 of vessel 12. Shield 14 is substantially rectangular in cross section though it is to be understood that it may be spherical-shaped or may take such other shape as is desired. A metallic box-like member 19, as for example steel, is disposed within reactor shield 14 and is spaced from the shield by means not shown to define with the latter a water channel or jacket 21. Member 19 is tightly sealed along its entire perimeter to form a fluid-tight compartment 23 with respect to water channel 21. Compartment 23 is suitably dimensioned to accommodate a neutronic reactor core and all of the piping and equipment comprising a primary loop, the latter and the reactor core not being shown but represented by a box 24 in FIG. 1. The type of neutronic reactor adaptable for the present invention is one which employs its fuel in a fluid or fluidized form, as for example, reactor fuel which is contained in a water or liquid metal solution or slurry. If desired, an economizer 26 and a superheater 28 may be employed in conjunction with the reactor, the piping communicating the economizer and superheater with the reactor being omitted from FIG. 1, for purposes of clarity.

In utilizing a neutronic reactor for nuclear powered water-sustained vessels or craft, consideration must be given to providing adequate safeguards in the event of a ship disaster which may lead to an explosion, thereby releasing dangerous radioactive fuel vapor to the atmosphere. As is well understood by those skilled in the art, the possibility of an explosion in a reactor employing fuel in a fluid form may occur if the pump or pumps circulating the reactor fuel to the heat exchanger in the primary loop are inactivated, or, if stoppage of the power plant equipment occurs. In such event, the reactor fuel temperature rises as a result of radioactive decay heat until a relief valve, rupture disc or some similar device exhausts the fuel from the reactor core and piping onto the floor of the surrounding compartment, as for example, the compartment 23 of FIG. 1. The vapor pressure of the fuel in the compartment may eventually rise to a point causing rupture of the compartment. Thus, in the event of a ship's collision, grounding, explosion or fire where the circulating pumps are stopped, the foregoing dangerous condition arises.

Figure 2:
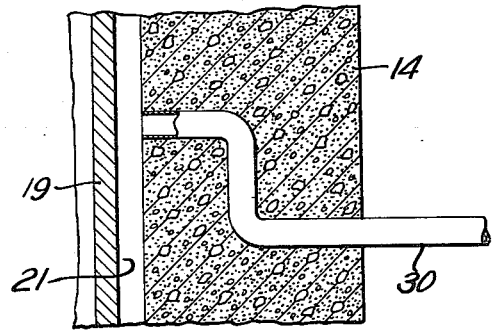
FIG. 2 is a view, in section, along line 2—2 of FIG. 1 to show one possible configuration of a single conduit as arranged within the reactor shield.

The present invention has for one of its objects the prevention of explosion of the reactor and escape of radioactive fuel vapor by removing or dissipating the radioactive decay heat generated after stoppage of the pumps and power plant equipment. To this end, a plurality of large diameter conduits 30 are employed to communicate water channel 21 with the exterior of the vessel and with the sustaining water. Conduits 30 are each connected at corresponding ends to water channel 21 at all points along its perimeter and the conduits then extend through reactor shield 14 into the open space of hold 16. The portions of conduits 30, within shield 14, each has sufficient curvature or bends (see, for example, FIG. 2) so that there is no direct line of sight through the conduits, thereby obviating harmful radiation from the neutrons within the reactor core which may pass through the conduit ends opposite to the said corresponding conduit ends connected to the water channel 21. The opposite ends of conduits 30 are accommodated within openings formed in the bottom and sides of hull 13 and are open to the exterior of the vessel and the sustaining water, the sea level of which is designated by the letter "L" in FIG. 1.

Figure 3:
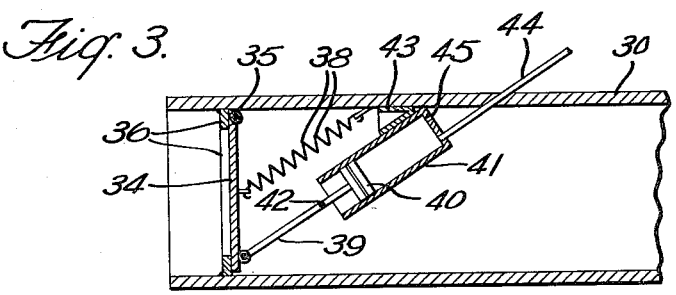
FIG. 3 is a schematic illustration of a valve assembly means disposed in a conduit of FIG. 1.

Disposed within each of the conduits 30, adjacent hull 13, are movable valve assembly means which are adapted to close off the conduits and thereby cut off communication between the exterior of the vessel and water channel 21 during normal operation of the vessel. One form of valve means is schematically shown in FIG. 3 wherein the same comprises a plate 34 movable about a pivot point 35, adjacent a ring 36, and urged in a counterclockwise direction about pivot 35 by spring means 38. A piston rod 39 has one end pivotally connected to the lower portion of plate 34 and the other end secured to a piston 40 slidable within a cylinder 41. Piston rod 39 has a pivoted joint 42 to accommodate movement of piston 40 within cylinder 41 upon counterclockwise movement of plate 34. Cylinder 41 is secured to a mounting bracket 43 in conduit 30 and is connected to a source of compressed air, as for example a motor-driven compressor (not shown) by an air line 44. A small air leak opening 45 is provided in cylinder 41 to permit discharge of air from the cylinder when the piston 40 moves to the right as seen in FIG. 3. In the normal operation of the vessel, it is assumed that the motor driving compressor (not shown) is functioning properly and compressed air is being delivered to cylinder 41, whereby a force is exerted through piston rod 40 to maintain plate 34 in the closed position shown in FIG. 3. If any damage occurs to the ship which affects the compressed air supply to cylinder 41, the pressure within the cylinder will be insufficient to overcome the tension of spring means 38 and the plate 34 will be displaced away from ring 36 and about pivot 35 to permit communication of water channel 21 with the exterior of the vessel. As a result, the sea water or sustaining water can flow through conduits 30 into water channel 21.

Figure 4:
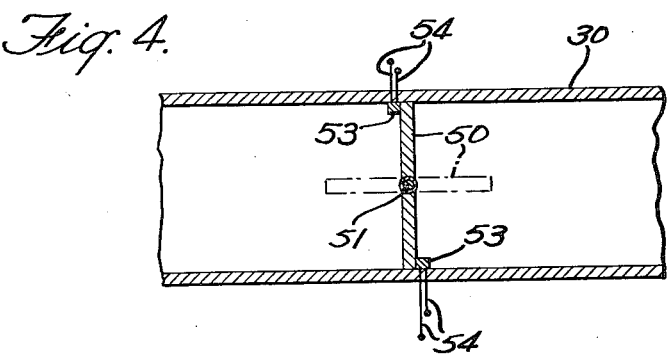
FIG. 4 is a schematic illustration of a different valve assembly means but similar in function to that shown in FIG. 3.

A second form of valve assembly means (FIG. 4) may be provided in the hull-side ends of conduits 30. The second valve assembly means comprises a metal valve plate 50 which is secured to a shaft 51 suitably supported in conduit 30. Shaft 51 is urged by spring means (not shown) for rotation in a clockwise direction in FIG. 4 to displace valve plate 50 to the broken line position therein. A pair of electromagnets 53 are arranged within the conduit 30 on opposite sides of plate 50 and are connected to a source (not shown) of electrical energy by leads 54. It will be apparent that in normal operation of the ship, valve plate 50 is in the full line position shown in FIG. 4 and is held in such position by the magnetic force exerted by the electromagnets 53 against the rotative force exerted on shaft 51 by the spring means not shown. Upon the occurrence of damage to the ship which results in the source of electrical energy being inactivated or disconnected from the electromagnets 53, the latter are de-energized whereby the spring means (not shown) effects rotation of shaft 51 and valve plate 50 to the broken line position in FIG. 4.

In normal operation, communication between water channel 21 and the exterior of the vessel is obstructed by the movable valve means in conduits 30. Upon the occurrence of damage to the vessel such as would cause stoppage of the power plant equipment or circulating pumps, the reactor fuel from the reactor core and associated piping is exhausted upon the floor of compartment 23, where the vapor pressure gradually builds up as a result of radioactive decay heat. Presumably, the energy source supplying compressed air or electrical energy, as the case may be, to the valve assembly means is disabled or disconnected from the latter, whereby the valve assembly means are actuated to positions permitting communication of the water channel 21 with the exterior of the vessel. Sea water thus flows through the conduits 30 and into water channel 21, where the water passes in heat exchange with the walls of box-like member 19 which is heated by the radioactive decay heat inside. The warmed sea water, adjacent the walls, will rise because of its reduced density through whichever of the conduits 30 have hull side ends at the highest elevation, as compared with the other hull side conduit ends. The rise of the warm water will draw cold water from those conduits which communicate with the sea water at a lower level or elevation. It will be noted that the conduits 30 are so disposed in hold 16 that regardless of the position of the damaged vessel in the sustaining water, or at the bottom of the sea, several of the conduits will have their hull side ends free of obstruction and at least two of these unobstructed conduits will be at different elevations above the bottom of the sea, so that a natural sea water circulation is induced in the conduits and water channel. With the radioactive decay heat carried to the sea water, insufficient pressure will be generated which would cause rupturing of the metal compartment 23. Consequently, explosions are prevented and dangerous radioactive vapor is not released to the atmosphere even though the ship may be cut in two or completely sunk.

It will now be apparent that the present invention provides a novel and effective safety arrangement for nuclear powered ships whereby the possibility of release of dangerous radioactive fuel vapors into the atmosphere is substantially obviated in those instances where damage to the ship causes stoppage of the circulating pumps and power plant equipment associated with the reactor. By utilizing an arrangement of conduits and a water channel to provide natural circulation of sea water past the compartment containing reactor fuel leakage, radioactive decay heat is constantly removed to prevent the rupture of said compartment resulting from excess reactor fuel vapor pressure.

Although one embodiment of the present invention has been shown and described in detail, it is to be expressly understood that the present invention is not limited thereto. Various changes can be made in the design and arrangement of the parts without departing from the spirit and scope of the invention as the same will now be understood by those skilled in the art.

What is claimed is:

1. A safety system for neutronic reactors aboard water-sustained vessels, comprising a shield for a neutronic reactor disposed within a vessel in sustaining water, a fluid-tight compartment within said shield defined by a wall and containing the reactor, said wall being spaced from the shield to define a water channel disposed below the level of the sustaining water, and conduit means having inlets communicating with the water channel at a plurality of points thereof and having outlets for communicating with sustaining water exterior of a vessel along at a plurality of points thereof, said conduit means being so disposed in said vessel that one outlet is at an elevation above another outlet with both outlets permitting passage of water therethrough regardless of the position of the vessel in the sustaining water, whereby decay heat liberated by reactor fuel after reactor shut-down causes a natural circulation of water through said water channel and said mentioned inlets and outlets of the conduit means to remove the decay heat from the compartment.

2. A safety system for neutronic reactors aboard water-sustained vessels for absorbing and removing decay heat liberated by reactor fuel after reactor shut-down, comprising a shield for a neutronic reactor disposed within a vessel in sustaining water, a fluid-tight compartment within said shield defined by a wall and containing the reactor, said wall being spaced from the shield to define a water channel disposed below the level of the sustaining water, and conduit means communicating the water channel with the sustaining water exterior of the vessel to provide for absorption of the liberated heat by water in said channel, said conduit means and said water channel constituting a water flow path providing for natural circulation of water through said path after reactor shut-down regardless of position of the vessel in the sustaining water.

3. The system of claim 2 wherein means are provided for maintaining said water channel out of communication with the sustaining water when reactor shut-down conditions are non-existent and for permitting communication of said water channel with the sustaining water when reactor shut-down exists.

4. A safety arrangement for neutronic reactors aboard water-sustained vessels for absorbing and removing decay heat from the reactor fuel after reactor shutdown comprising a shield for the reactor disposed within a vessel in sustaining water, a fluid-tight compartment within said shield defined by a wall and containing the reactor, said wall being spaced from the shield to provide a water channel disposed below the level of the sustaining water, a plurality of conduits communicating a water channel with the sustaining water exterior of the vessel, each of said conduits being connected at one end to the water channel and at their other ends to the hull of the vessel, said conduits communicating with each other to provide at least one conduit serving as an inlet conduit for the water channel to pass sustaining water to the latter, and at least another conduit serving as an outlet conduit from the water channel to discharge water from the latter to the exterior of the vessel regardless of the position of the vessel in the sustaining water.

5. The safety arrangement of claim 4 wherein the said another conduit is elevated above the one conduit to provide a natural circulation of water through both said last-mentioned conduits and said water channel when reactor shut-down exists.

6. A safety arrangement for neutronic reactors aboard water sustained vessels for absorbing and removing decay heat from the reactor fuel after reactor shut-down, comprising a shield for a reactor disposed within a vessel in sustaining water, a fluid-tight compartment within said shield defined by a wall and containing the reactor, said wall being spaced from the shield to provide a water channel disposed below the level of the sustaining water, a plurality of conduits having corresponding ends connected to the water channel at along substantially the entire perimeter thereof and the opposite ends connected to the bottom and sides of the hull of the vessel for communicating the water channel with the exterior of the vessel, some of said conduits being disposed at higher elevations than others and arranged to provide at least one conduit at a higher elevation than another conduit to provide passage of water through said conduits and water channel after reactor shut-down regardless of the position of the vessel in the sustaining water, and means operable to cut off communication of said opposite ends of the conduit to the exterior of the vessel.

7. The safety arrangement of claim 6 wherein the last-mentioned operable means comprises valves arranged in said opposite ends of the conduits.

8. A safety arrangement for neutronic reactors aboard water-sustained vessels for absorbing and removing decay heat liberated by reactor fuel after reactor shut-down, comprising a shield for a reactor disposed within a vessel in sustaining water, a fluid-tight compartment within said shield defined by a wall and containing the reactor, said wall being spaced from the shield to provide a water channel disposed below the level of the sustaining water, a plurality of conduits communicating the water channel with the exterior of the vessel, a movable valve member for each of said conduits disposed in one position to prevent flow of water through the conduit and in a second position permitting flow of water through said conduit, means exerting a biasing force on said valve member to move the latter to said second position, and means operable upon said valve member to overcome the biasing force on the latter to maintain it in said one position when a reactor shut-down condition is nonexistent and permitting said biasing force to be effective when a reactor shut-down condition exists to move the valve member to said second position.

9. A safety arrangement for neutronic reactors aboard water sustained vessels for absorbing and removing decay heat liberated by reactor fuel after reactor shut-down, comprising a shield for a reactor disposed within a vessel in sustaining water, a fluid-tight compartment within said shield defined by a wall and containing the reactor, said wall being spaced from the shield to provide a water channel disposed below the level of the sustaining water, a plurality of conduits communicating the water channel with the exterior of the vessel, a movable valve member for each of said conduits disposed in one position to prevent flow of water through the conduits and in a second position permitting flow of water through said conduit, spring means exerting a force on said valve member to move the latter to said second position, and piston type actuating means operable by a compressed fluid to act upon said valve member to overcome the force exerted on the latter to thereby maintain the valve member in said one position, said piston type actuating means being ineffective to maintain said valve member in said one position upon failure of compressed fluid thereto, whereby said spring means moves said valve member to the second position to thereby communicate the water channel with the exterior of the vessel.

10. A safety arrangement for neutronic reactors aboard water-sustained vessels for absorbing and removing decay heat liberated by reactor fuel after reactor shut-down, comprising a shield for a reactor disposed within a vessel in sustaining water, a flid-tight compartment within said shield defined by a wall and containing the reactor, said wall being spaced from the shield to provide a water channel disposed below the level of the sustaining water, a plurality of conduits communicating the water channel with the exterior of the vessel, and a movable electrically operated spring-biased valve member in each of said conduits and operable in a first position when connected to a source of electrical energy to maintain the water channel out of communication with the exterior of the vessel, said valve member being operable when disconnected from the source of electrical energy to be biased to a second position to permit communication of said water channel with the exterior of the vessel.

References Cited in the file of this patent

UNITED STATES PATENTS

| | | |
|---|---|---|
| 2,671,817 | Groddeck | Mar. 9, 1954 |
| 2,782,158 | Wheeler | Feb. 19, 1957 |
| 2,807,581 | Fermi et al. | Sept. 24, 1957 |
| 2,811,487 | Stanton | Oct. 29, 1957 |
| 2,873,243 | Wigner et al. | Feb. 10, 1959 |

OTHER REFERENCES

Engineer (London), vol. 203, No. 5272 (Feb. 8, 1957), pages 214—215.

Atomics, October 1956, pages 347, 352, 353